United States Patent [19]
Bissonnette

[11] Patent Number: 5,700,421
[45] Date of Patent: Dec. 23, 1997

[54] CUTTING NOZZLE ASSEMBLY FOR A POSTMIXED OXY-FUEL GAS TORCH

[76] Inventor: Claude Bissonnette, 232 11 St. West, Cornwall, Ontario, Canada, K6H 3B2

[21] Appl. No.: 981,352

[22] Filed: Nov. 25, 1992

[51] Int. Cl.$^6$ ............................................. B23K 7/00
[52] U.S. Cl. ............................ 266/48; 266/76; 266/77; 266/902; 266/903; 266/904; 239/288; 239/288.3; 239/288.5
[58] Field of Search .................... 266/74, 48, 904, 266/77, 76, 902, 903; 148/194, 205; 239/421, 419.3, 419.5, 428, 424.5, 288, 288.3, 288.5

[56] References Cited

U.S. PATENT DOCUMENTS

| | | | |
|---|---|---|---|
| 3,590,212 | 6/1971 | Corrigall et al. | 219/130 |
| 3,923,448 | 12/1975 | Guth | 239/428 |
| 4,443,003 | 4/1984 | Bleys | 266/48 |
| 4,455,176 | 6/1984 | Fuhrhop | 148/196 |
| 5,120,026 | 6/1992 | Bissonnette | 266/48 |

FOREIGN PATENT DOCUMENTS

| | | | |
|---|---|---|---|
| 468938 | 10/1950 | Canada | 266/48 |

Primary Examiner—Sikyin Ip
Attorney, Agent, or Firm—Pearne, Gordon, McCoy & Granger LLP

[57] ABSTRACT

A novel cutting nozzle assembly for a postmixed oxygen-fuel gas torch is disclosed. The nozzle assembly includes a cylindrical shroud which surrounds and extends away from the gas discharge orifices in the gas discharge end of the cutting nozzle. The cylindrical shroud has the advantage of producing a tighter gas stream and of promoting a more thorough mixing of the preheat oxygen and the fuel gas to provide a hotter, more compact flame which produces a more parallel-sided cut through metal workpieces. The cutting tip therefore conserves metal as well as cutting gases. It also cuts faster than prior art postmixed cutting nozzles.

15 Claims, 4 Drawing Sheets

CUTTING NOZZLE ASSEMBLY FOR A POSTMIXED OXY-FUEL GAS TORCH

FIELD OF THE INVENTION

The present invention relates to oxy-fuel gas torches and, in particular, to a cutting nozzle for postmixed oxy-fuel gas torches.

BACKGROUND OF THE INVENTION

Oxy-fuel gas cutting torches are useful for cutting ferrous alloys. With the proper equipment, cuts can be effected through very thick billets. In operation, an oxy-fuel torch is used to direct an ignited stream of oxygen and fuel gas onto the surface of the metal to be cut. The metal is thus heated to its ignition temperature, at which point a stream of cutting oxygen directed at the surface oxidizes the heated metal to effect the cut.

The cutting torch may be one of a premixed or a post-mixed type torch. In a premixed torch, preheat oxygen and fuel gas are mixed within the torch head before being discharged for ignition. In a postmixed cutting torch, the preheat oxygen and fuel gas are discharged from the torch in unmixed streams. Turbulence in the discharged streams mixes the oxygen and fuel gas before ignition occurs. A principal advantage of the postmixed cutting torch is that it is not subject to flashback, a potential hazard associated with the use of premixed torches. Flashback occurs when the oxygen and fuel gas mixture in a premixed torch ignites within the torch head. Postmixed torches are therefore preferred for heavy industrial applications where a torch is subjected to considerable heat. A further advantage of the postmixed torch is that postmixed nozzles produce a longer heat zone than premixed nozzles. This permits the post-mixed torch to operate farther from the work, decreasing the heat stress on the torch and the increasing service life of the nozzle.

An example of a prior art postmixed oxy-fuel gas cutting torch and nozzle are taught in the U.S. Pat. No. 4,455,176 which issued to Fuhrhop on Jan. 19, 1984. That patent describes a combination cutting torch and nozzle assembly for post-mixed oxy-fuel cutting using two separate annular streams of preheat oxygen gas surrounding the fuel gas stream with the inner annular preheat oxygen stream directed to impinge the fuel gas stream very close to the point of discharge from the nozzle assembly. The nozzle assembly is secured to the head of the cutting torch by a hollow retaining nut which forms an annular gap with the nozzle assembly for discharging the outer preheat oxygen gas stream.

All prior art postmixed nozzles for oxy-fuel gas torches operate in substantially the same way. A stream of cutting oxygen is discharged from an axial bore in the nozzle. A plurality of fuel gas discharge orifices arranged in a concentric ring around the axial bore discharge preheat fuel gas and a second plurality of gas discharge orifices arranged in an outer concentric ring discharge preheat oxygen which acts as an envelope that surrounds the fuel gas stream. As the gas streams flow toward the workpiece, a mixing of the fuel gas and the oxygen occurs and the mixture ignites to heat the workpiece.

Testing has shown that up to 50% of the preheat oxygen stream discharged from prior art postmixed torch nozzles is lost to the atmosphere before mixing with the fuel gas occurs. This contributes to inefficient combustion and slows the heating process. It also contributes to the cost of cutting since gases are not utilized to their potential. It has also been observed that prior art postmixed torch nozzles are incapable of effecting a parallel-sided cut through a thick workpiece. The cut is narrower along a top of the workpiece than along a bottom of the workpiece. The thicker the workpiece, the wider the cut at the bottom side. If many thick billets must be cut, a significant loss of metal occurs.

A further disadvantage of prior art cutting nozzles for postmixed oxy-fuel gas torches is their direct exposure to splashback of molten metal from the cut. Splashback metal tends to stick to the discharge end of the nozzle, frequently blocking discharge orifices. When this occurs, the torch must be shut down to permit the nozzle to be cleaned or replaced. This interrupts workflow and increases operating expenses.

SUMMARY OF THE INVENTION

It is an object of the invention to provide a cutting nozzle assembly which overcomes the disadvantages of the prior art.

It is a further object of the invention to provide a cutting nozzle assembly which promotes more efficient combustion of oxy-fuel gas mixtures.

It is yet a further object of the invention to provide a cutting nozzle assembly which minimizes nozzle damage due to the splashback of molten metal onto the discharge end of the nozzle.

It is yet a further object of the invention to provide a cutting nozzle assembly which provides a cleaner cut that minimizes the loss of metal during a cutting operation.

In accordance with the invention there is provided a cutting nozzle for a postmixed oxy-fuel gas torch, comprising a nozzle assembly having an axial bore through which cutting oxygen gas is discharged and a first and second plurality of spaced-apart gas discharge bores arranged in an inner and an outer concentric ring around the axial bore, the inner ring being in fluid communication with a fuel gas conduit of the torch when the cutting nozzle is coupled to the torch and the outer ring being in fluid communication with a preheat oxygen gas conduit of the torch when the cutting nozzle is coupled to the torch, the axial bore and the gas discharge bores terminating in discharge orifices on a discharge end of the cutting nozzle; and a shroud surrounding and extending away from the discharge end of the cutting nozzle to protect the nozzle from cutting splashback and to promote a mixing action of the gases discharged from the nozzle.

The present invention therefore provides a cutting nozzle assembly for a postmixed oxy-fuel gas torch having a shroud which extends away from the discharge end of the nozzle to protect the discharge end of the nozzle from molten metal splashback and to concentrate, direct, and promote the mixing of the oxygen/fuel gas streams. This results in a narrower, cleaner more parallel-sided cut which conserves metal at the cut and increases the speed and efficiency of cutting. The service life of the nozzle is further increased because the discharge end of the nozzle is shielded from splashback. Molten metal splashback having a trajectory which enters the throat of the shroud is generally cooled by the gas stream to a point that it does not fuse with the nozzle before it contacts the nozzle discharge end. Nozzles in accordance with the invention have been operated for weeks under industrial work conditions without requiring maintenance or replacement.

In accordance with a first embodiment of the invention, the shroud is an integral part of the retainer nut used to couple the nozzle to the torch and the retainer nut further includes a flange which is pierced with bores that discharge the preheat oxygen. This embodiment is particularly cost efficient to produce because it minimizes the quantity of metal required in the nozzle as well as the machining time required to form the nozzle assembly.

In accordance with a second embodiment of the invention, the shroud is an integral part of a retainer nut which is used to couple the nozzle to the torch, but the nozzle includes all of the gas discharge bores.

BRIEF DESCRIPTION OF THE DRAWINGS

These and other features of the invention will be more fully described by way of example only and with reference to the following drawings, wherein.

DETAILED DESCRIPTION OF THE PREFERRED EMBODIMENTS

Figure 1:
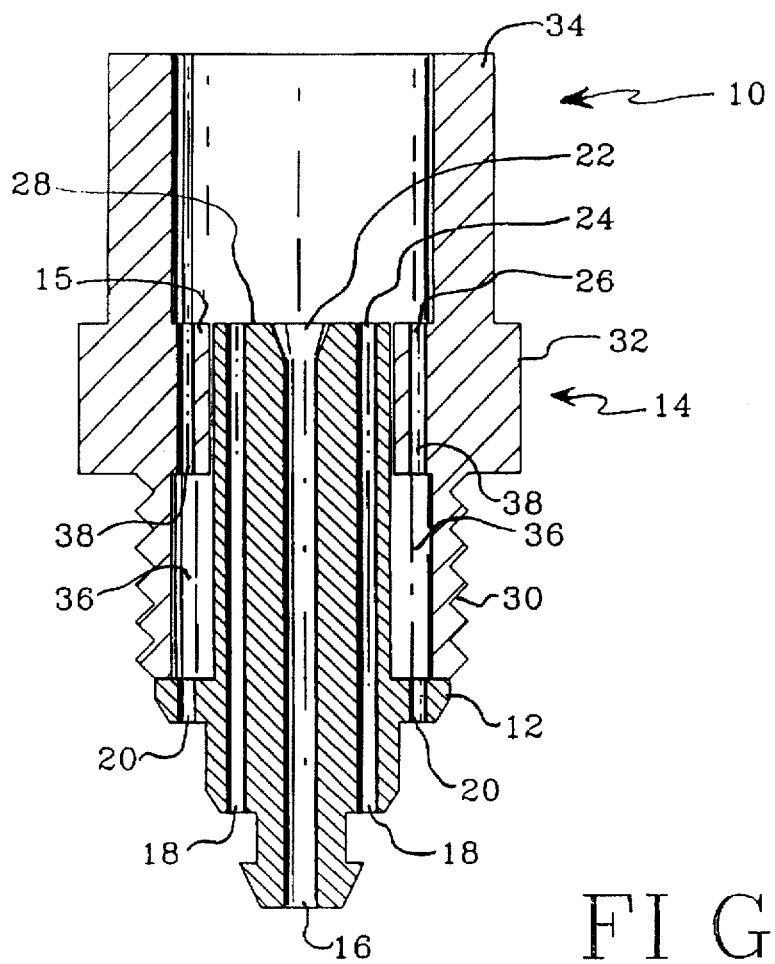
FIG. 1 is a longitudinal cross-sectional view of a preferred embodiment of a postmixed torch nozzle assembly in accordance with the invention.

FIG. 1 shows a longitudinal cross-sectional view of a cutting nozzle in accordance with a preferred embodiment of the invention. The cutting nozzle assembly, generally referred to by reference 10, includes a nozzle 12 and a hollow retainer nut 14. The nozzle 12 includes an axial bore 16 for discharging cutting oxygen from a cutting torch (see FIG. 5), a plurality of fuel gas bores 18 arranged in an inner concentric ring around the axial bore 16, and a plurality of preheat oxygen bores 20 arranged in an outer concentric ring around the axial bore 16. Each of the bores 16, 18 and 20 terminates in a discharge orifice 22, 24 and 26 respectively in a discharge end 28 of the cutting nozzle assembly 10.

Figure 5:
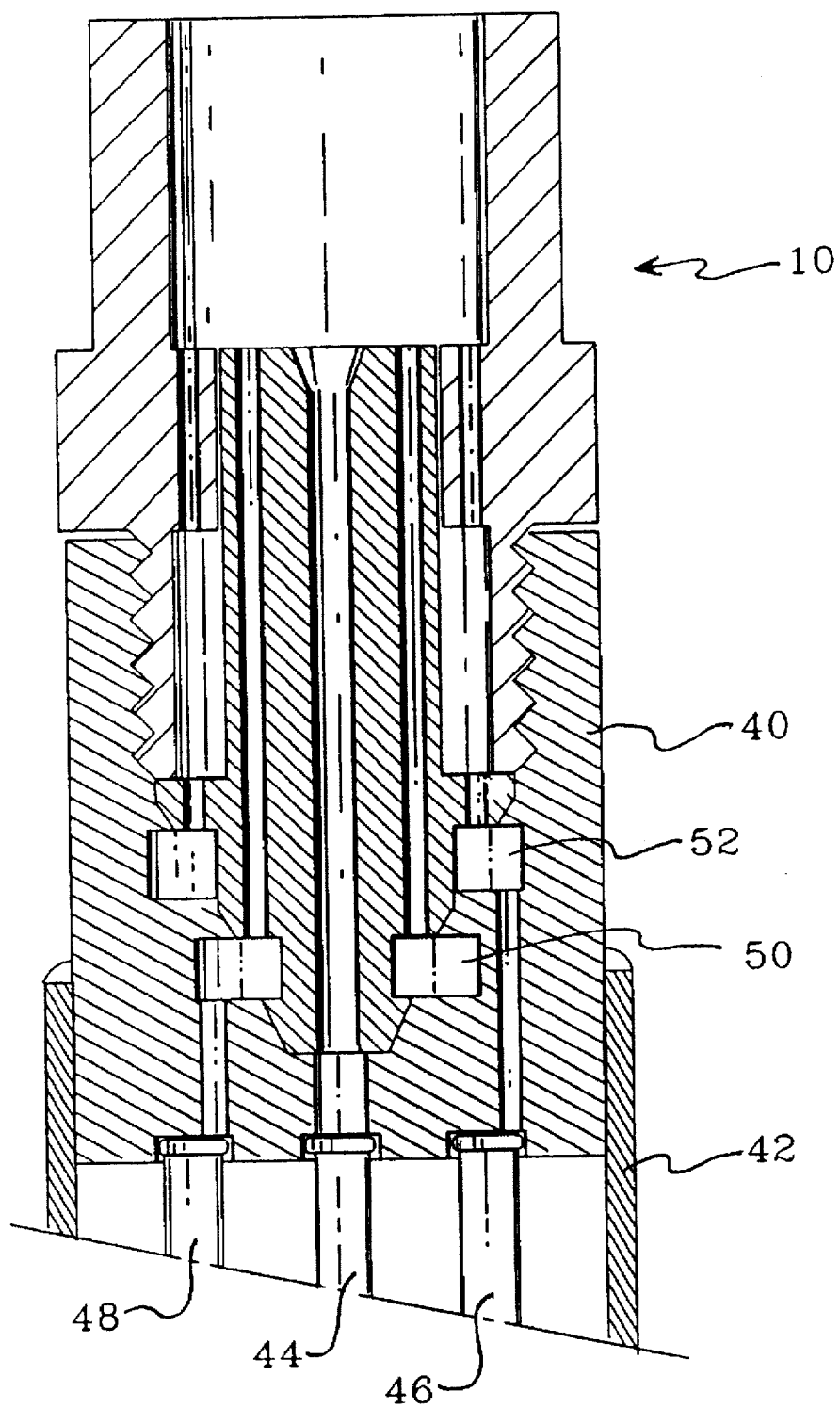
FIG. 5 is a partial cross-sectional view of the postmixed nozzle assembly shown in FIG. 1 coupled to a postmixed cutting torch.

The retainer nut 14 surrounds the nozzle 12 and is used to couple it with a cutting torch (see FIG. 5). In accordance with the preferred embodiment of the invention, an annular flange 15 in an inner periphery of the retainer nut 14 forms a portion of the discharge end 28 of the cutting nozzle assembly 10. The retainer nut 14 includes a spiral thread 30, a hexagonal rib 32 to provide a gripping surface for a wrench, and a shroud 34 which surrounds and extends away from the discharge end 28 of the cutting nozzle assembly 10. The shroud 34 is preferably a circular cylinder although other cylindrical shapes may also be used.

As described above, the retainer nut 14 preferably forms a part of the discharge end 28 of the cutting nozzle assembly 10. The hollow retainer nut 14 surrounds the nozzle 12. The preheat oxygen bores 20 in the nozzle 12 communicate with a cavity 36 in the retainer nut 14. The annular flange 15 of the retainer nut 14 is provided with preheat oxygen bores 38 which communicate with the preheat oxygen discharge orifices 26. Thus, preheat oxygen entering preheat oxygen bores 20 passes through the cavity 36 in the retainer nut 14 and exits through the preheat oxygen bores 38 via the preheat oxygen discharge orifices 26. This configuration of the cutting nozzle assembly 10 provides the most economically produced assembly because it minimizes drilling and material requirements.

Figure 2:
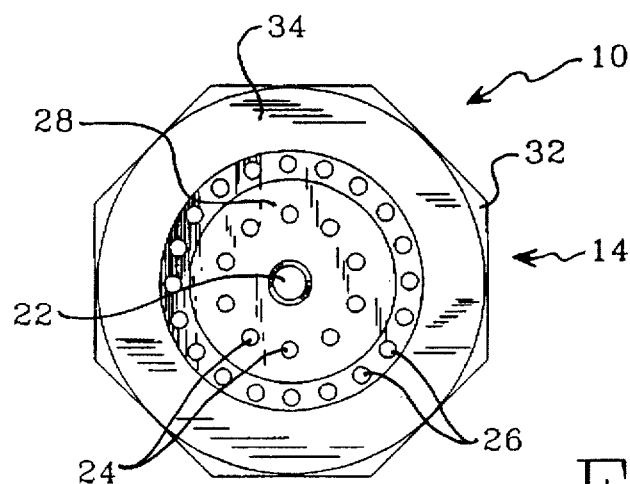
FIG. 2 is a top plan view of the postmixed nozzle assembly shown in FIG. 1.

FIG. 2 shows a top plan view of the cutting nozzle assembly 10 shown in FIG. 1. As is apparent, the hexagonal rib 32 of the retainer nut 14 provides a gripping surface for a wrench to facilitate coupling the cutting nozzle assembly to a torch. The shroud 34 surrounds the discharge end 28 of the cutting nozzle. The discharge end 28 includes discharge orifices 22 for cutting oxygen, 24 for fuel gas and 26 for preheat oxygen. The discharge orifice 22 for cutting oxygen is preferably flared. This creates a swirl effect within the interior of the shroud 34 to promote the mixing of fuel gas and oxygen. The shroud 34 also shields the discharge end 28 from molten metal splashed back from the cut. This enhances the service life of the nozzle because it substantially eliminates nozzle damage resulting from splashback metal contacting the nozzle and fusing with it.

Figure 3:
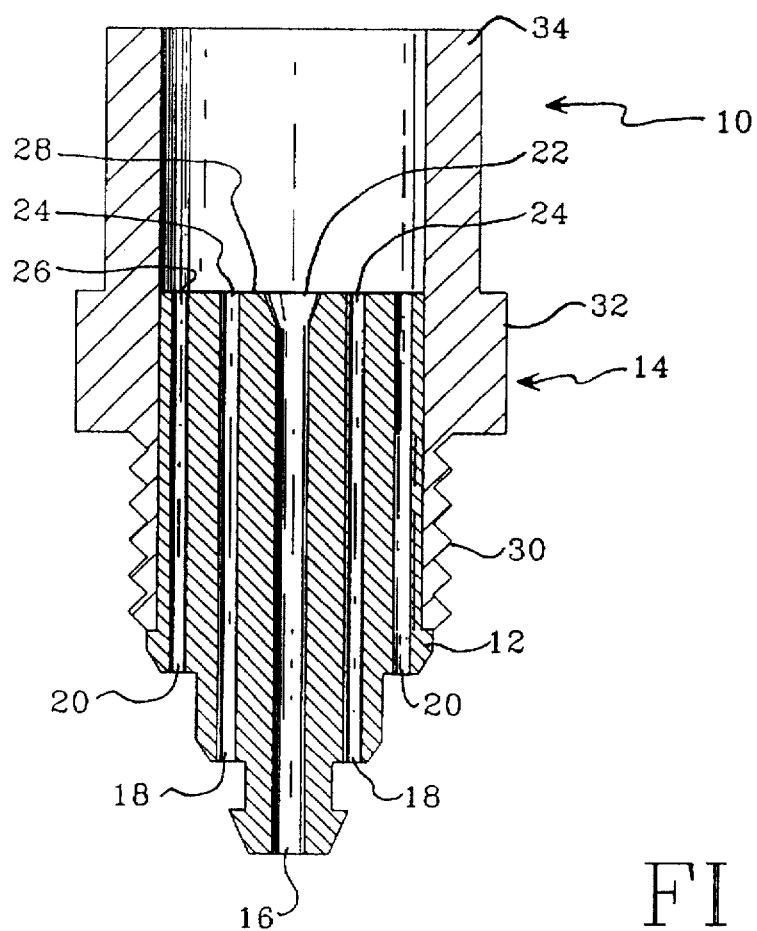
FIG. 3 is a longitudinal cross-sectional view of a second embodiment of a postmixed nozzle assembly in accordance with the invention.

FIG. 3 is a longitudinal cross-section through a second embodiment of the invention. The cutting nozzle assembly is substantially identical in structure to the assembly shown in FIGS. 1 and 2. In this embodiment, the nozzle 12 includes all of the discharge bores. The retaining nut 14 supports the shroud 34. The cutting oxygen discharge orifice 22, the fuel gas discharge orifices 24 and the preheat oxygen discharge orifices 26 are all located in the discharge end 28 of the nozzle 12. In all other respects, the cutting nozzle assembly 10 as shown in FIG. 2 is identical to the cutting nozzle assembly 10 shown in FIG. 1. This embodiment of the invention requires slightly more material to manufacture as well as more machining time but produces identical cutting results.

Figure 4:
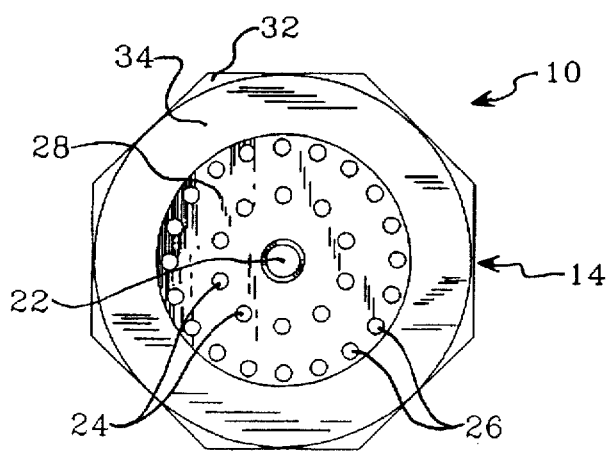
FIG. 4 is a top plan view of the postmixed nozzle assembly shown in FIG. 3.

FIG. 4 shows a top plan view of the nozzle shown in FIG. 3. The nozzle is identical to the embodiment shown in FIG. 2 except that there is no seam between the fuel gas discharge orifices 24 and the preheat oxygen orifices 26.

Cutting nozzle assemblies 10 are preferably constructed from brass alloy, although other materials such as copper, stainless steel and the like may also be used. The shroud 34 is preferably at least 0.65" (16.5 mm) long. Longer lengths may be used but much shorter lengths are not recommended. The thickness of the sidewall of the shroud 34 is preferably about 0.22" (5.58 mm) for good resistance to heat fatigue although a thinner sidewall may be used successfully. At least the outer surface of the sidewall of the shroud 34 is preferably plated with chrome or nickel to inhibit the adhesion of molten metal splashback.

FIG. 5 shows the cutting nozzle assembly 10 illustrated in FIG. 1 connected to a typical postmixed oxy-fuel gas torch. The oxy-fuel gas torch includes a torch head 40 to which the cutting nozzle fuel assembly is coupled using the retainer nut 14. The torch head 40 is supported by a tubular handle 42. The tubular handle is hollow. Extending through the tubular handle are supply tubes for cutting oxygen, fuel gas and preheat oxygen. Supply tube 44 supplies cutting oxygen from an oxygen source. Supply tube 46 supplies fuel gas from a fuel gas source, and supply tube 48 supplies preheat oxygen from the oxygen source. The fuel gas supply tube 46 and the cutting oxygen supply tube 48 terminate in radial distribution grooves 50 and 52, respectively. The operation of postmixed oxy-fuel gas torches is well understood by those skilled in the art.

Figure 6:
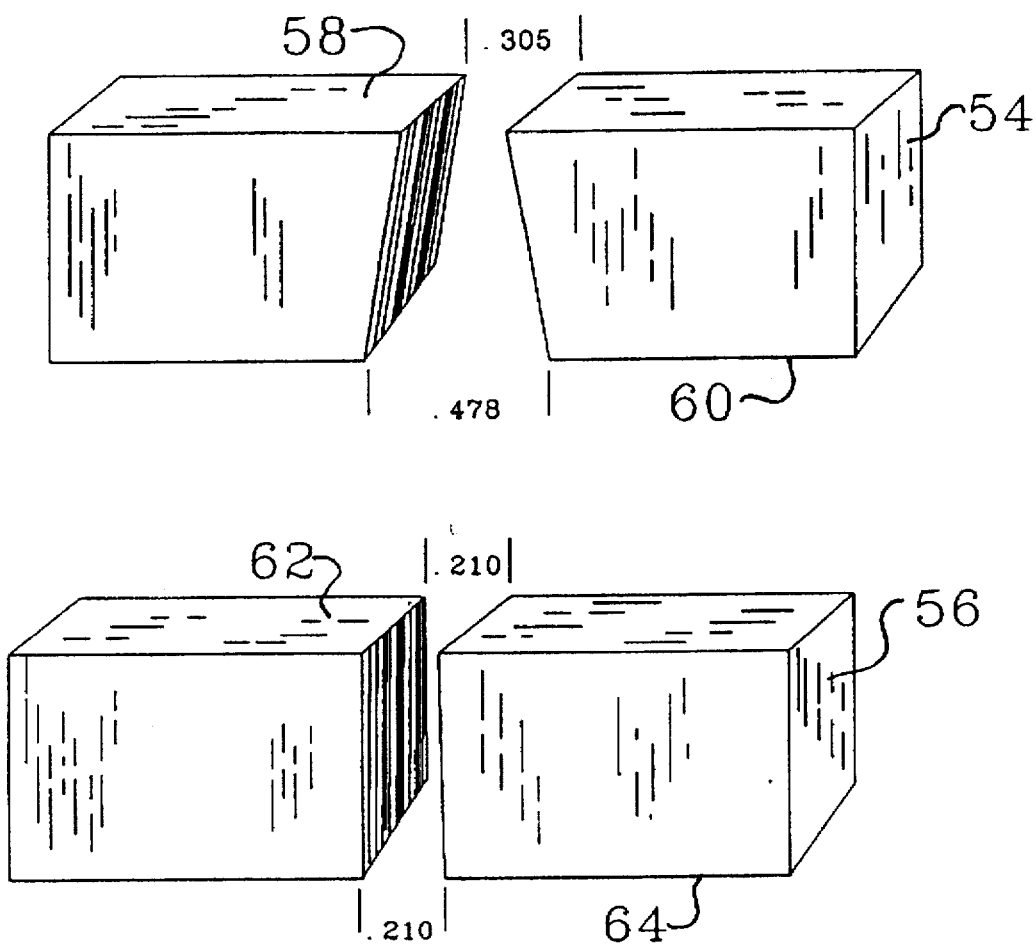
FIG. 6 is a schematic view of a cut through a 4¾ inch steel billet effected with a prior art cutting nozzle and a cut through the same billet effected with a cutting nozzle in accordance with the invention.

FIG. 6 shows a schematic diagram of two steel billets cut using a postmixed oxy-fuel gas torch. Each billet is approximately 4¾" (12 cm) thick. A first billet 54 was cut using a typical prior art postmixed cutting nozzle. A second billet 56 was cut using a cutting nozzle in accordance with the invention. As is apparent, the kerf of the cut through the second billet 56 is narrower and more parallel-sided than the kerf of the cut through the first billet 54. The kerf of the cut through the first billet 54 is approximately 0.305" (7.75 mm) wide where the cut commences at the top surface 58 of the first billet. The kerf is approximately 0.478" (12.14 mm) wide at the bottom surface 60 of the first billet 54. In contrast, the width of the kerf at the top surface 52 of the second billet 58 is approximately 0.21" (5.33 mm) wide and the kerf at the bottom surface 64 of the second billet 56 is also approximately 0.21" (5.33 mm) wide. It is, therefore, apparent that the cutting nozzle in accordance with the invention cuts a much thinner kerf and produces cut ends which are much more square than kerfs achieved with the prior art postmixed nozzles tested. Experimentation has been established that a postmixed cutting nozzle in accordance with the invention produces 40% less slag than a prior art nozzle of the same type. In a production environment, this represents a considerable saving in energy and cut materials. The cleaner kerf produced by a cutting nozzle assembly 10 in accordance with the invention is due to the tighter, more cylindrical gas discharge stream promoted by the shroud 34 (see FIGS. 1 through 5). The shroud 34 promotes a more thorough mixing of the preheat oxygen and the fuel gas and produces a gas stream that maintains its shape over a much longer distance than a gas stream discharged by prior art postmixed nozzles.

Industrial Applicability

The cutting nozzle for a postmixed oxy-fuel gas torch in accordance with the invention is useful in cutting steel and other ferrous alloys, particularly in industrial production environments such as steel mills where large slabs must be cut into billets for handling or processing. Because the cutting nozzle provides a cleaner and narrower cut than prior art nozzles of the same type, the nozzle conserves materials and energy. The cutting nozzle assembly also has a prolonged service life because it is less susceptible to damage due to the splashback of molten metal. Operating overheads are therefore reduced. The cutting nozzle assembly 10 in accordance with the invention may be used in any application where metals must be rapidly and efficiently cut by oxidation.

It is therefore apparent that a new and useful cutting nozzle for postmixed oxy-fuel gas torches has been invented.

The embodiments described above are intended to be exemplary only. Those skilled in the art will understand that certain prior art postmixed nozzle constructions may be modified to accord with the invention by welding or soldering a shroud to either the retainer nut or the discharge end of the prior art nozzle or by redesigning a retainer nut to include an integral shroud. Changes and modifications to the specifically described embodiments may be made without departing from the scope of the invention which is intended to be limited solely by the scope of the appended claims.

The embodiments of the invention in which an exclusive property or privilege is claimed are defined as follows:

1. A cutting nozzle assembly for a postmixed oxy-fuel gas torch, comprising:

a nozzle having an axial bore through which cutting oxygen gas is discharged and a first and second plurality of spaced apart gas discharge bores arranged in an inner and outer concentric ring around the axial bore, the inner ring being in fluid communication with a fuel gas conduit of the torch when the nozzle assembly is coupled with the torch and the outer ring being in fluid communication with a preheat oxygen gas conduit of the torch when the nozzle assembly is coupled with the torch, the axial bore and the gas discharge bores terminating in discharge orifices on a discharge end of the cutting nozzle assembly; and a shroud which surrounds and extends in an axial direction away from the discharge end of the nozzle to an open end, said shroud having an axial extent adequate to protect the nozzle from cutting splashback and to promote a mixing action of the gases discharged from the nozzle assembly, and whereby a more narrow cut is achieved to conserve metal at the cut and increase efficiency of cutting as compared with a similar nozzle not having a shroud.

2. The cutting nozzle assembly as claimed in claim 1 wherein the shroud is integral with a hollow retainer nut used to couple the cutting nozzle assembly to the torch.

3. The cutting nozzle assembly as claimed in claim 2 wherein the shroud comprises a circular cylinder.

4. A cutting nozzle assembly for a postmixed oxy-fuel gas torch, comprising:

a nozzle having an inner end adapted for being received in a head of the torch and an outer end for discharging oxygen and fuel gases, an axial bore that extends between the inner and outer discharge end for discharging cutting oxygen gas, and a first and second plurality of spaced-apart gas discharge bores arranged in an inner and outer concentric ring around the axial bore, the inner ring of bores being in fluid communication with a fuel gas conduit of the torch and extending through the nozzle to the discharge end thereof, and the outer ring being in fluid communication with a preheat oxygen gas conduit of the torch and extending through the inner end of the nozzle to a hollow chamber defined by a side wall of a retainer nut for coupling the nozzle to the torch;

a side wall of the retainer nut including a spiral thread on an outer periphery thereof and an annular flange on an inner periphery thereof, the annular flange including a plurality of spaced-apart preheat oxygen discharge bores which communicate with the cavity; and a shroud affixed to the retainer nut, the shroud defining a cylindrical passage which surrounds the discharge orifices for preheat oxygen, fuel gas and cutting oxygen whereby a more narrow cut is achieved to conserve metal at the cut and increase efficiency of cutting as compared with a similar nozzle not having a shroud.

5. The cutting nozzle assembly as claimed in claim 4 wherein the shroud comprises a circular cylinder.

6. The cutting nozzle assembly as claimed in claim 4 wherein the shroud is integral with the retainer nut.

7. A cutting nozzle assembly for a postmixed oxy-fuel gas torch, comprising:

a nozzle having an axial bore through which cutting oxygen gas is discharged and a first and second plurality of spaced-apart gas discharge bores arranged in a inner and outer concentric ring around the axial bore, the inner ring being in fluid communication with a fuel gas conduit of the torch when the nozzle is coupled with the torch and the outer ring being in fluid communication with a preheat oxygen gas conduit of the torch when the nozzle is coupled with the torch, the axial bore and the gas discharge bores terminating in discharge orifices on a discharge end of the nozzle;

a retainer nut for coupling the nozzle to the torch, a top end of the retainer nut including a shroud which surrounds and extends in an axial direction away from the discharge end of the nozzle to an open end, said shroud having an axial extent adequate to protect the nozzle from cutting splashback and to promote a mixing action of the gases discharged from the nozzle whereby a more narrow cut is achieved to conserve metal at the cut and increase efficiency of cutting as compared with a similar nozzle not having a shroud.

8. A cutting nozzle for a postmixed oxy-fuel gas torch, comprising:

a nozzle having an intake end and a discharge end, the intake end being adapted to be received in a nozzle seat of the postmixed oxy-fuel gas torch;

the nozzle including passages for conducing cutting oxygen gas, preheat oxygen gas and fuel gas from the torch to the discharge end of the nozzle; and a shroud which surrounds and extends in an axial direction away from the discharge end of the nozzle to an open end, said shroud having an axial extent adequate to protect the discharge end of the nozzle from molten metal splashback and to promote a mixing action of the preheat oxygen gas and the fuel gas discharged from the nozzle whereby a more narrow cut is achieved to conserve metal at the cut and increase efficiency of cutting as compared with a similar nozzle not having a shroud.

9. The cutting nozzle as claimed in claim 8 wherein the shroud is integral with a hollow retainer nut used to couple the cutting nozzle to the torch.

10. The cutting nozzle as claimed in claim 9 wherein the shroud has a side wall having a length of at least 0.65 inches.

11. The cutting nozzle as claimed in claim 10 wherein the side wall is about 0.22 inches thick.

12. The cutting nozzle as claimed in claim 11 wherein the shroud comprises a circular cylinder.

13. The cutting nozzle as claimed in claim 12 wherein the nozzle is constructed from brass.

14. The cutting nozzle as claimed in claim 13 wherein at least an outer surface of the side wall of the shroud is plated with a one of chrome and nickel to inhibit the adhesion of molten metal splashback to the outer surface.

15. The cutting nozzle as claimed in claim 8, wherein said shroud is axially fixed on said nozzle.

\* \* \* \* \*